United States Patent
Halushka et al.

(10) Patent No.: US 9,214,019 B2
(45) Date of Patent: Dec. 15, 2015

(54) METHOD AND SYSTEM TO DIGITIZE PATHOLOGY SPECIMENS IN A STEPWISE FASHION FOR REVIEW

(75) Inventors: Marc Kenneth Halushka, Timonium, MD (US); Toby Charles Cornish, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 197 days.

(21) Appl. No.: 13/985,716

(22) PCT Filed: Feb. 15, 2012

(86) PCT No.: PCT/US2012/025273
§ 371 (c)(1),
(2), (4) Date: Sep. 24, 2013

(87) PCT Pub. No.: WO2012/112697
PCT Pub. Date: Aug. 23, 2012

(65) Prior Publication Data
US 2014/0029813 A1    Jan. 30, 2014

Related U.S. Application Data

(60) Provisional application No. 61/443,022, filed on Feb. 15, 2011.

(51) Int. Cl.
*G06K 9/00* (2006.01)
*G06K 9/36* (2006.01)
*G06T 7/00* (2006.01)
*G06T 3/40* (2006.01)

(52) U.S. Cl.
CPC ............. *G06T 7/0012* (2013.01); *G06T 3/40* (2013.01); *G06T 2207/10056* (2013.01); *G06T 2207/20016* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 6,101,265 A * | 8/2000 | Bacus et al. | 382/133 |
| 6,711,283 B1 * | 3/2004 | Soenksen | 382/133 |
| 7,113,625 B2 * | 9/2006 | Watson et al. | 382/133 |
| 7,822,257 B2 * | 10/2010 | Endo et al. | 382/133 |
| 7,894,645 B2 | 2/2011 | Barsky | |
| 7,925,070 B2 * | 4/2011 | Sumida et al. | 382/134 |
| 7,929,738 B2 * | 4/2011 | Shirota et al. | 382/128 |
| 7,940,998 B2 * | 5/2011 | Doerrer | 382/286 |
| 8,126,250 B2 * | 2/2012 | Cooke et al. | 382/133 |
| 8,582,924 B2 * | 11/2013 | De La Torre-Bueno et al. | 382/305 |
| 2005/0123181 A1 * | 6/2005 | Freund et al. | 382/128 |
| 2008/0095424 A1 * | 4/2008 | Iki et al. | 382/133 |
| 2010/0290678 A1 * | 11/2010 | Dekel | 382/128 |
| 2011/0075897 A1 | 3/2011 | Dekel et al. | |
| 2011/0131535 A1 * | 6/2011 | Tagami et al. | 715/838 |
| 2011/0234812 A1 | 9/2011 | Grunkin et al. | |
| 2011/0292197 A1 | 12/2011 | Kishima | |
| 2012/0069049 A1 * | 3/2012 | Howe et al. | 345/629 |

* cited by examiner

*Primary Examiner* — Soo Park
(74) *Attorney, Agent, or Firm* — Johns Hopkins Technology Transfer

(57) ABSTRACT

A system for reviewing digitized images of pathology specimens includes an image processing system and an image display system adapted to communicate with the image processing system. The image processing system is configured to receive a whole-slide digital image of a pathology specimen, segment the whole-slide digital image into a tissue-particle image within the whole-slide digital image, and represent the tissue-particle image as a plurality of image tiles such that each of the plurality of image tiles can be displayed sequentially on the image display system to permit a substantially complete, tile-by-tile review of the tissue-particle image in a predefined order.

33 Claims, 4 Drawing Sheets

METHOD AND SYSTEM TO DIGITIZE PATHOLOGY SPECIMENS IN A STEPWISE FASHION FOR REVIEW

CROSS-REFERENCE TO RELATED APPLICATIONS

This application is a 35 U.S.C. §371 U.S. national entry of International Application PCT/US2012/025273 having an international filing date of Feb. 15, 2012, which claims the benefit of U.S. Provisional Application No. 61/443,022 filed Feb. 15, 2011, the content of each of the aforementioned applications is herein incorporated by reference in their entirety.

BACKGROUND

1. Field of Invention

The field of the currently claimed embodiments of this invention relates to digital light microscopy, and more particularly to systems and methods for reviewing digitized images of pathology specimens.

2. Discussion of Related Art

The standard method of examining tissue sections under a microscope requires a number of preliminary steps. Specimens are first acquired from human or animal tissues and then are typically fixed in formalin and embedded in paraffin. Thin tissue sections are cut from the paraffin blocks and mounted on glass slides. The tissue sections are stained with chemical and/or antibody-based staining reagents that highlight structures of interest. To review the slide digitally, it is then digitized using a slide scanner, which is essentially a robotic microscope with specialized software. Digitizing a slide produces a single whole slide image (WSI) from each glass slide. Whole slide images are typically stored as a pyramid of images of decreasing resolution. The images are typically organized in a tiled format that allows rapid retrieval of subregions from the image. At full resolution, these whole slide images can have a density of around 0.25 micrometers per pixel and gigapixel sizes. Adoption of digital or "virtual" microscopy has been slow. While there have been improvements in the speed and quality of scanning hardware, image viewers and viewing techniques have remained stagnant. There is little variation in the viewing software provided by commercial interests. Conventional whole slide image viewer software implements a relatively standard "pan-and-zoom" interface which attempts to replicate interaction with the microscope using a mouse or similar input device. In a typical "pan-and-zoom" interface, the user is presented with a viewport displaying all or a portion of the WSI at a given magnification and location. Using the mouse and on-screen user interface elements, the user can increase or decrease the magnification of the image ("zoom") and translate the WSI in the X and Y axes ("pan"). Compared to the relative ease of operating a microscope, navigating digital slides is unintuitive, cumbersome and slow. This results in lost productivity and user frustration. There thus remains a need for improved systems and methods for reviewing digitized images of pathology specimens.

SUMMARY

A system for reviewing digitized images of pathology specimens according to an embodiment of the current application includes an image processing system and an image display system adapted to communicate with the image processing system. The image processing system is configured to receive a whole-slide digital image of a pathology specimen, segment the whole-slide digital image into a tissue-particle image within the whole-slide digital image, and represent the tissue-particle image as a plurality of image tiles such that each of the plurality of image tiles can be displayed sequentially on the image display system to permit a substantially complete, tile-by-tile review of the tissue-particle image in a predefined order.

A computer-readable medium according to an embodiment of the current application includes computer-executable code for a system for reviewing digitized images of pathology specimens. The computer-executable code includes instructions that, when executed by a computer, causes the computer to receive a whole-slide digital image of a pathology specimen, segment the whole-slide digital image into a tissue-particle image within the whole-slide digital image, and represent the tissue-particle image as a plurality of image tiles such that each of the plurality of image tiles can be displayed sequentially on an image display system to permit a substantially complete, tile-by-tile review of the tissue-particle image in a predefined order.

A method for reviewing digitized images of pathology specimens according to an embodiment of the current application includes receiving a whole-slide digital image of a pathology specimen, segmenting the whole-slide digital image into a tissue-particle image within the whole-slide digital image, and representing the tissue-particle image as a plurality of image tiles such that each of the plurality of image tiles can be displayed sequentially on an image display system to permit a substantially complete, tile-by-tile review of the tissue-particle image in a predefined order.

BRIEF DESCRIPTION OF THE DRAWINGS

Further objectives and advantages will become apparent from a consideration of the description, drawings, and examples.

DETAILED DESCRIPTION

Figure 1:
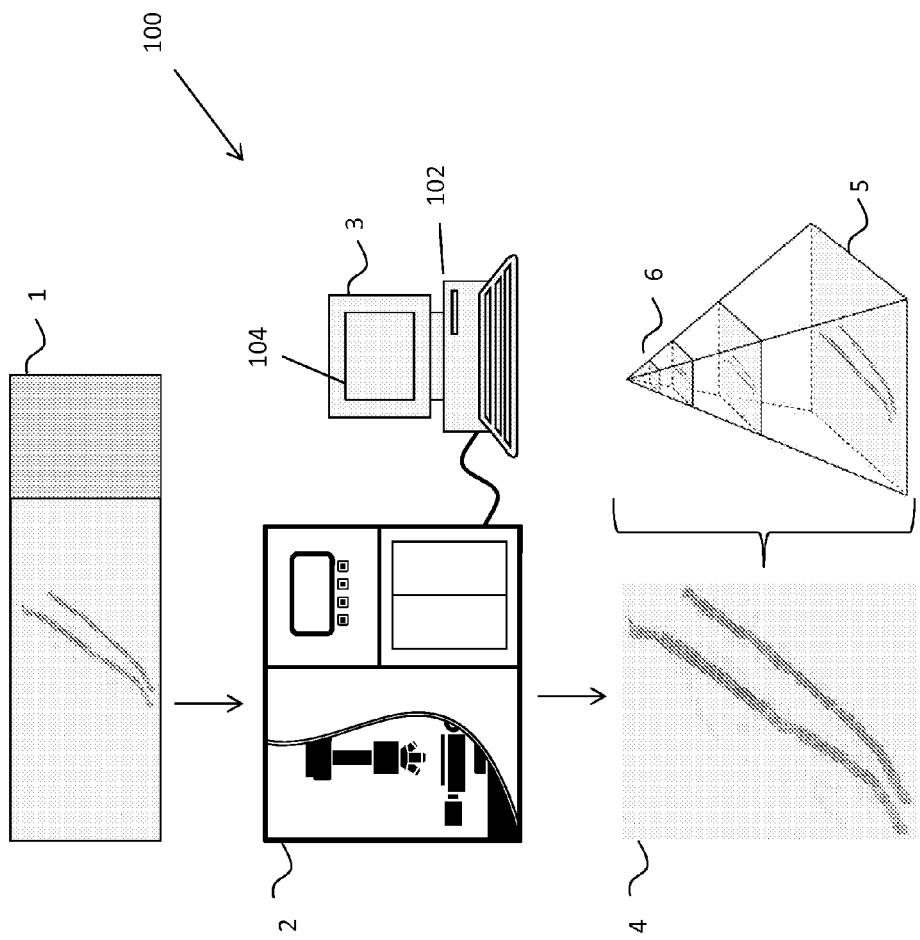
FIG. 1 is a schematic illustration of systems and methods for reviewing digitized images of pathology specimens according to some embodiments of the current invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

If the promise of digital or "virtual" microscopy is to be fully realized, then we must have tools that are as good as, or better than current methods of slide evaluation. Currently, microscopists interact directly with a glass slide, using their fingers or an X-Y stage to move the slide while focusing in the Z-axis. In practice, rather than viewing the slide while in continuous motion, the behavior of the typical microscopist is to first view a microscopic field at a given point A, then to incrementally move the slide to an adjacent field at point B. In this manner, the microscopist uses learned hand-eye coordination and visual-spatial processing to decompose the slide into a series of static fields of view. The current navigation paradigm in digital microscopy relies on a computer mouse or other input device to "drag" the displayed image from one location to another. Some embodiments of the current invention can provide a quicker, more robust method to move from point A to point B.

Specifically, some embodiments of the current invention can provide a method and system that will take a digital whole slide image, identify individual tissue fragments, reorient them and generate a series of static images that represents the minimal set of overlapping subregions required to cover all tissue present on the slide. This series of subregions is then displayed to the user with a forward/back mechanism for scrolling through the subregions in a stepwise manner. This improvement removes the step of continually repositioning the slide, which is time consuming, can lead to eye and mental fatigue and can result in missing areas of the slide containing tissue.

Therefore, a method for facilitating the digital review of histologic and cytologic preparations of tissue is provided according to some embodiments of the current invention. These are often primarily for diagnostic and research purposes. This method can simplify the navigation of digital slides by decomposing the whole slide image into a series of overlapping regions and provide the user with a simple interface for navigating through these fields.

Some embodiments of the current invention can provide a method of presenting whole slide image data to the user and facilitating user interaction with the image. This method of navigating the whole slide image can also supplement or integrate with the "pan-and-zoom" user interface that is ubiquitous in current whole slide image viewers. As such, the user would access the whole slide image data either locally or via a network connection. The method according to an embodiment of the current invention analyzes a whole slide image file and identifies all tissue areas on the slide. Separate tissue particles or "blobs" are then identified and each tissue particle is divided into an efficiently arranged series of subregions covering the entire tissue area. The user can be provided with user interface controls for jogging forward and backward through the sequence of subregion images. When the user comes to the last subregion for one tissue particle, the first subregion for the next tissue particle is presented. The user interface can also present a thumbnail image of the whole slide, indicating the outline of the subregion currently being viewed and the areas already viewed. At any time, the user may toggle the method off and return to a "pan-and-zoom" mode using the current view. The user may then toggle the "subregion viewing" method back on and the interface will snap to the nearest subregion.

There are several additional attributes of the system according to some embodiments when fully implemented. In some embodiments, the method tracks the amount of time spent viewing each subregion to automatically identify subregions of interest. A heat map overlaid on the WSI thumbnail can be used to visualize the time spent in each region. Additionally, the most important or challenging regions of the slide can be automatically identified as those viewed the longest and these areas can be automatically flagged as "key areas" for additional review or peer consultation. This can be helpful for quality assurance, slide conferences, tumor boards, training programs or similar. The method can track and display the number of subregions in a "tissue particle" (also referred to as "blob") and the number of "tissue particles" in a slide to make the user aware of how much of a slide has been visualized or how much remains. A keyboard hot key, hardware button and/or software user interface button can be included for capture of a particular subregion for display in an email, publication, surgical pathology report or similar. In addition to the full steps between the overlapping subregions, keyboard hot keys, hardware buttons and/or software user interface buttons can be used to move in smaller steps (e.g. quarter-steps, half-steps, or user-defined steps) incrementally along a path connecting the centers of two adjacent subregions. This can be used when an area of interest (i.e. important lesion) is at the edge of one subregion and extends into a second subregion. A keyboard hot key, hardware button and/or software user interface button can be used to change magnification of the subregion of interest to toggle to a higher power magnification. Here the subregion would be further subdivided into additional subregions extracted from higher resolution images from the image pyramid.

Embodiments of the present invention can be useful in the field of diagnostic medicine (human and veterinary pathology), forensic medicine and research in the areas of disease, pharmaceuticals, anatomy and histology, for example.

FIG. 1 provides a schematic illustration of a system for reviewing digitized images of pathology specimens 100 according to an embodiment of the current invention. The system 100 includes an image processing system 102 and an image display system 104 adapted to communicate with the image processing system 102. In the example of FIG. 1, the image processing system 102 and an image display system 104 are both implemented on a computer 3. The computer 3 can be a desk top computer, a workstation or specially designed image processing and display system, for example. The computer 3 can be a single computer, a networked computer, a distributed computing system over a network and/or a computer cluster in some embodiments. The image processing system 102 can be implemented in hardware and/or software. For example, it can be software implemented on the CPU of the computer 3. In other embodiments, it can be dedicated hardware components such as, but not limited to, ASICs and/or FPGA, for example. The image processing system 102 can be implemented on a single processor, multiple processors or parallel processors, for example.

The image processing system 102 is configured to receive a whole-slide digital image of a pathology specimen, segment the whole-slide digital image into a tissue-particle image within the whole-slide digital image, and represent the tissue-particle image as a plurality of image tiles such that each of the plurality of image tiles can be displayed sequentially on the image display system to permit a substantially complete, tile-by-tile review of the tissue-particle image in a predefined order.

A whole-slide digital image of a pathology specimen can be received in the following way. Tissue sections on a glass slide 1 can be digitized using any of a number of commercially-available slide scanners 2. The slide scanners transfer the digital image data to the workstation 3 that creates and stores a large whole slide image 4 by stitching together a number of smaller tiles or strips. The whole slide image is stored in an image file typically as a so-called "image pyramid." In the image pyramid 5, the base is formed by the highest spatial resolution image, while a series of higher levels are composed of serially-reduced resolution images. The highest level in the pyramid 6 has the lowest spatial resolution and subsequently the smallest image dimensions. This is typically referred to as a "thumbnail." However, the broad concepts of the current invention are not limited to this example. In other embodiments a previously stored whole-slide digital image can be obtained by any suitable data transfer process, such as directly from storage media and/or receiving data transfer over a network, such as the Internet, for example.

A digitized image of glass slide 1 can contain at least one tissue-particle image with the whole-slide image. FIG. 1 shows and example in which there are two tissue-particle images within the whole slide image. In many applications, there will often be a plurality of tissue-particle images such as two, or 5, or up to 15. However, the broad concepts of the current invention are not limited to a particular number of tissue-particle images within the whole-slide images. The image processing system segments the tissue-particle image within the whole-slide image. For example, in FIG. 1 the image processing system may segment the image portions of each of the two tissue particles to distinguish the tissue-particle images from background for example. The tissue-particle image is represented as a plurality of image tiles as will be described in more detail below.

The image processing system 102 is also configured to reorient the tissue-particle image prior to representing the tissue-particle image as the plurality of image tiles. If there are two or more tissue-particle images, the image processing system 102 can be configured to reorient each tissue-particle image prior to representing each tissue-particle image as a separate plurality of image tiles. For example, each of the tissue-particle images in the whole-slide image of slide 1 can be reoriented such that they have a longitudinal axis that aligns along a predefined viewing axis, such as, but not limited to, a vertical or a horizontal axis in FIG. 1. This can be done independently for each of the tissue-particle images, for example.

Figure 2:
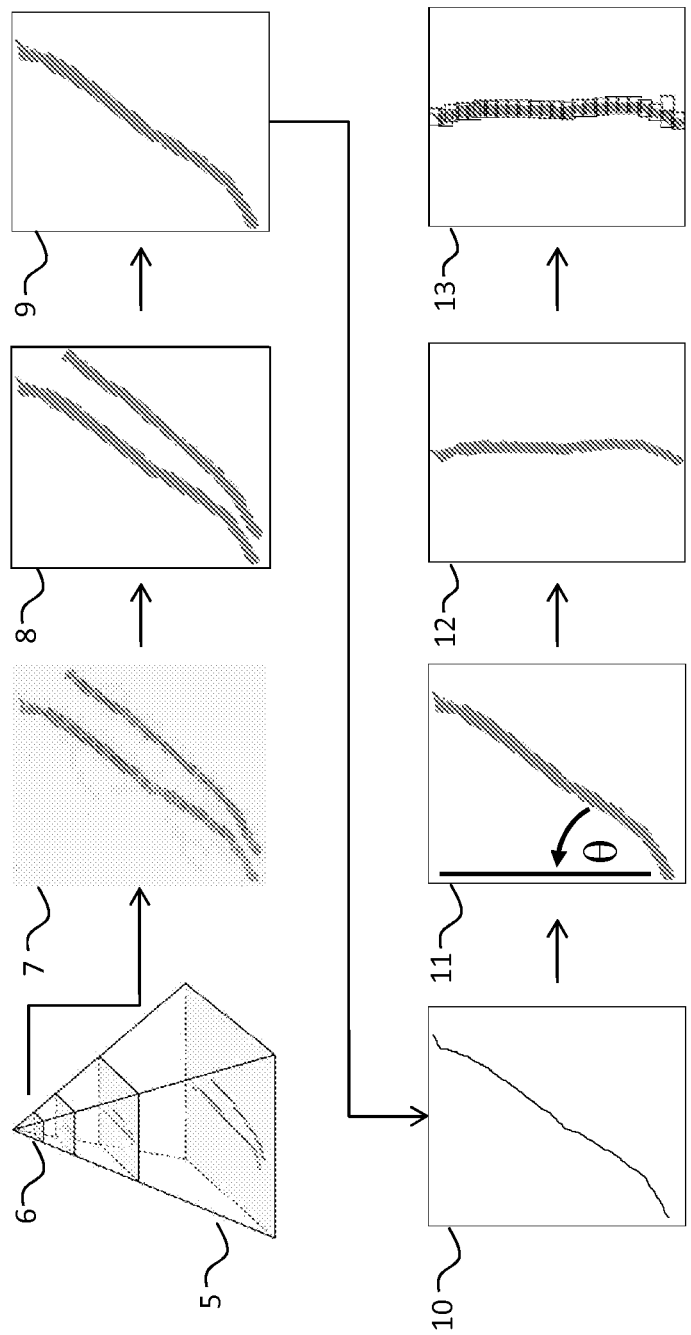
FIG. 2 depicts the process of identifying the tissue particles in each WSI and dividing each tissue particle into a series of overlapping subregions according to an embodiment of the current invention.

FIG. 2 describes a particular example in more detail. The user would indicate the whole slide image 4 (from FIG. 1) that he or she wishes to view. This whole slide image could reside locally on the user's workstation or remotely (on the network or internet). The data in the WSI file would be accessed directly via the file system or through one of several established communication protocols for transmitting whole slide image data. The whole slide image data is accessed directly using libraries that support the file format of the particular whole slide image. The tissue on the slide is then identified. First, the WSI is analyzed to determine the pyramid structure (if present). The highest resolution image in the file is then identified 5 and its equivalent optical resolution is determined from the available metadata in the file. The optical resolution of the other images in the pyramid (if present) is then determined by either reading metadata in the file or calculated by comparing the pixel dimensions to the pixel dimensions of the highest resolution image. The smallest image in the WSI pyramid 6 is read to generate a thumbnail 7 of the WSI. The thumbnail image is then segmented 8 into regions of tissue and non-tissue (empty glass). A smoothing filter is first applied to remove noise. For brightfield images, automated grayscale thresholding (the method of Otsu or similar) or Hue-Saturation-Brightness (or similar) colorspace segmentation is used. For fluorescence images, the user may need to identify the channel or channels that alone or combined best represent the tissue boundary. Tissue identification can then proceed by grayscale thresholding on that channel (or combination of channels). Segmentation results in a binary image 8 in which a zero value is assigned to background (empty glass) pixels and a non-zero value is assigned to foreground (tissue) pixels. A binary closing operation is performed to improve connectedness and small holes in the binary image are filled.

The binary thumbnail is then divided into separate particles or "blobs" (tissue-particle images) using standard methods for 4-or 8-connected particle identification. The remainder of the process is detailed for the first of the two identified particles 9. Each particle is binary skeletonized and the skeleton is pruned 10. A best-fit ellipse is calculated for each skeleton and the angle theta between the long axis of the best-fit ellipse and the vertical axis is determined. The binary image for each particle is then rotated by –theta degrees 11 such that the long axis of the best fit ellipse is aligned with the vertical axis of the image 12. Each tissue particle is then efficiently divided into overlapping image subregions (image tiles) covering the entire tissue particle area. Image subregions are then determined for each particle. The dimensions of an image subregion is user configurable such that it can be adjusted for different tasks, display configurations, and tissue types. The user supplies either the subregion dimensions in micrometers or provides the desired equivalent optical resolution and the size in micrometers is calculated from the resolution of the full size image and the user's display. The subregion dimensions are then scaled to the coordinate system of the binary thumbnail image, resulting in a subregion width w and height h. The coordinates (four vertexes per subregion) of the image subregions are then calculated for each particle by raster scanning across and down the binary image until the row r containing the first non-zero pixel is encountered. Starting at row r, a region of interest (one pixel wide by the height of the subregion) is raster scanned across the image until the column c containing the first non-zero pixel is encountered. The subregion vertexes (r,c; r+w,c; r+w, c+h; r,c+h) are recorded and the pixels in the subregion are set to zero in the binary image. The process is repeated until all non-zero pixels are assigned to a subregion 13. Subregion identification then proceeds for all remaining particles.

Figure 3:
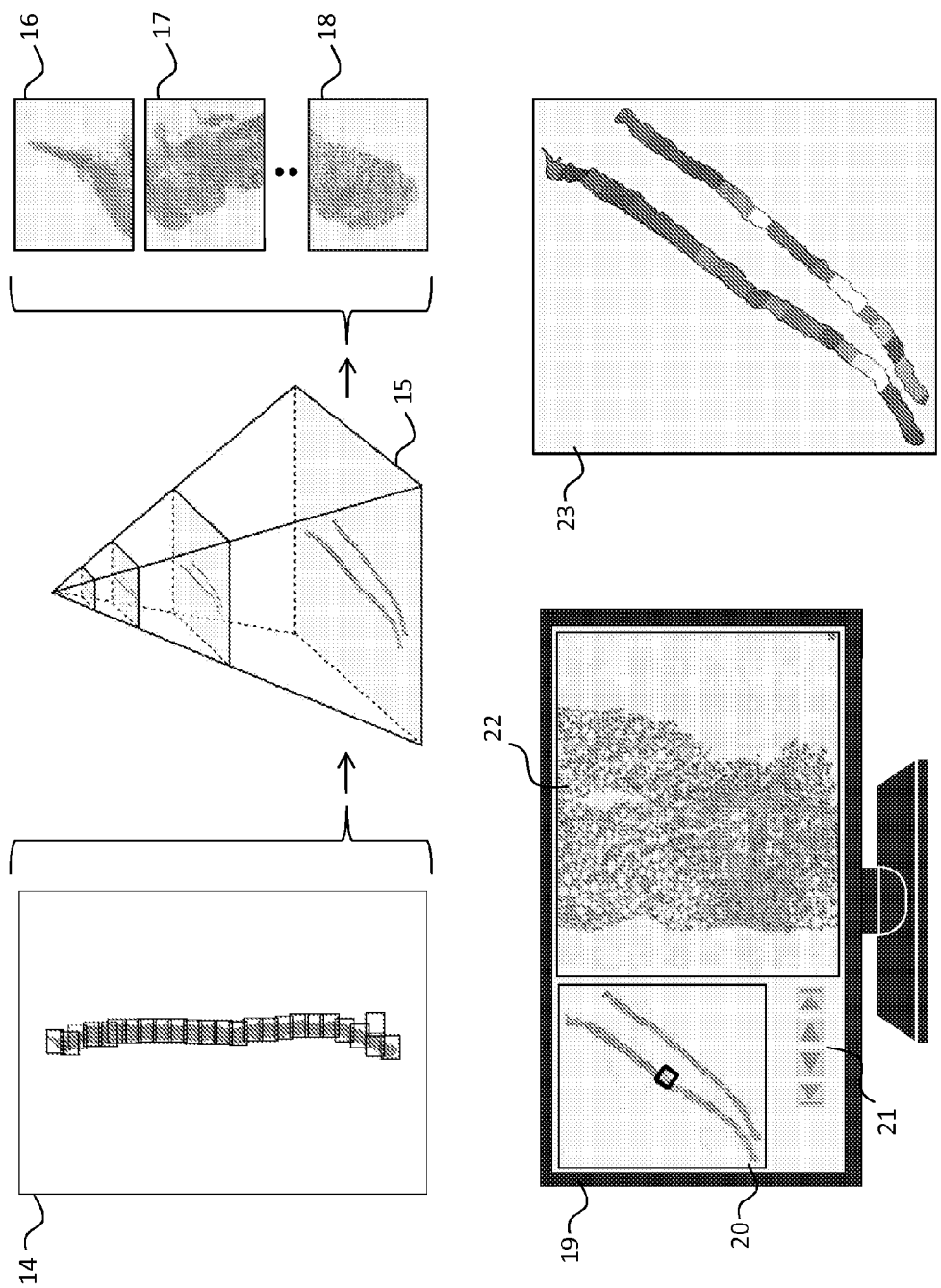
FIG. 3 depicts the process of extracting the subregions for a single tissue particle from the full resolution image, displaying these subregions to the user, and producing a heatmap visualization of time spent viewing each subregion according to an embodiment of the current invention.

As is illustrated in FIG. 3, the segmented subregion 14 is generated from the highest resolution full size image 15 for display to the user. The first subregion from the first particle is the image 16. To display the desired subregion, the coordinates of the subregion vertexes are transformed (rotated by theta degrees and scaled) back to the coordinate system of the full size image. Using the transformed vertexes, the image data from the subregion is extracted from the full size image 15, then rotated by theta degrees 16. The user is provided with keyboard hot keys, hardware buttons and/or software user interface buttons 21 to jog forward and backward through the sequence of subregions 16-18. The total time spent viewing each subregion is recorded. When the last subregion in a particle is reached, the first subregion in the next particle is displayed. The simplest version of the user interface (UI) would display the subregion in a large viewport 22 alongside a thumbnail version of the whole slide image 20 with an outline of the currently displayed subregion overlaid. The user interface thumbnail image also displays an overlay of the subregions already visited and can display a heatmap 23 indicating the absolute or relative amount of time spent viewing each image. At any time, this method of interacting with the slide can be toggled off, returning the user to a "pan-and-zoom" interface. The user can subsequently toggle the method back on, snapping to the nearest subregion and continuing with the method.

Figure 4:
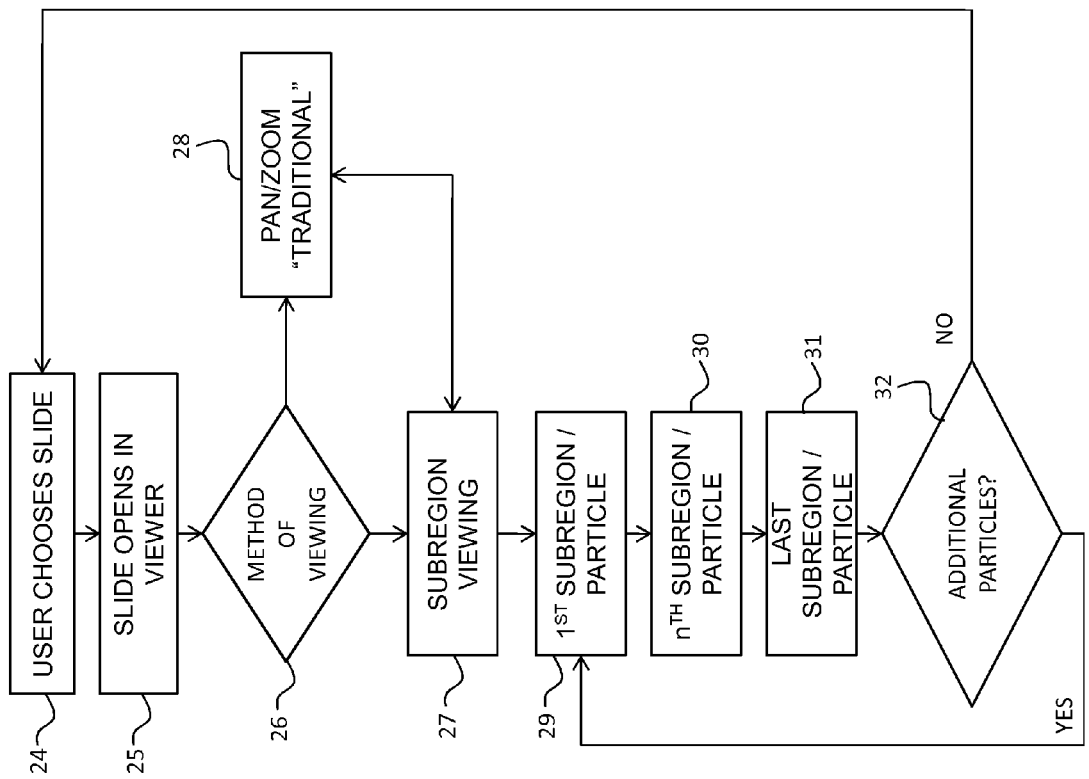
FIG. 4 is a simplified flow chart depicting the user interface/experience with the segmenting viewer according to an embodiment of the current invention.

FIG. 4 provides a flow chart to illustrate an example of the use of a system, software and/or methods according to some embodiments of the current invention. The user begins the session by selecting a slide to view 24. A digital representation of the slide is opened in a viewer 25. The user then chooses 26 to view the slide using a traditional pan-and-zoom method 28 or with the subregion viewing method 27. When subregion viewing is selected, the slide is transformed as described in FIG. 2 into multiple particles 9 and further segmented into multiple subregions 13. The first subregion of the particle is shown to the user 29. When the user is finished looking at the image, the user clicks forward to the next subregion in the particle 30. This is repeated for all subregions in the particle 31. When the last image in the particle is displayed 32, the program shows the user the first subregion in the next particle 29 or, if this is the last particle in the whole slide image, the program offers the next whole slide image 24. Throughout the viewing of subregions 29-31 metrics on viewing time are being recorded and stored in the attached workstation.

Some embodiments of the current invention include methods as described above as well as software that implements the methods, for example on the system 100.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A system for reviewing digitized images of pathology specimens, comprising:
   an image processing system; and
   an image display system adapted to communicate with said image processing system,
   wherein said image processing system is configured to:
   receive a whole-slide digital image of a pathology specimen,
   segment said whole-slide digital image into a tissue-particle image within said whole-slide digital image,
   represent said tissue-particle image as a plurality of image tiles such that each of said plurality of image tiles can be displayed sequentially on said image display system to permit a substantially complete, tile-by-tile review of said tissue-particle image in a predefined order;
   wherein segmenting said whole-slide digital image segments said whole-slide digital image into a plurality of tissue-particle images,
   represent each of said plurality of tissue-particle images as respective pluralities of image tiles such that each respective plurality of image tiles can be displayed sequentially on said image display system to permit a substantially complete, tile-by-tile review of each of said plurality of tissue-particle images in respective predefined orders; and
   reorient each of said tissue-particle images, independently, prior to representing each of said tissue-particle images as said respective pluralities of image tiles.

2. A system for reviewing digitized images of pathology specimens according to claim 1, wherein said plurality of image tiles are substantially equal in image size and are a minimum number of image tiles required to provide a complete, tile-by-tile review of said tissue-particle image.

3. A system for reviewing digitized images of pathology specimens according to claim 1, wherein said image processing system is further configured to reorient said tissue-particle image prior to representing said tissue-particle image as said plurality of image tiles.

4. A system for reviewing digitized images of pathology specimens according to claim 3, wherein said image processing system is further configured to determine a longitudinal dimension and a lateral dimension of said tissue-particle image such that said longitudinal dimension is an effective long axis of said tissue-particle image and said lateral dimension is an effective short axis of said tissue-particle image.

5. A system for reviewing digitized images of pathology specimens according to claim 4, wherein said reorienting said tissue-particle image comprises aligning said longitudinal axis along a preferred viewing axis.

6. A system for reviewing digitized images of pathology specimens according to claim 1, further comprising a user input device adapted to communicate with said image processing system,
   wherein said user input device is constructed and arranged to permit a user to send signals to said image processing system to toggle between said image tiles.

7. A system for reviewing digitized images of pathology specimens according to claim 6, wherein said toggling between image tiles comprises both forward and backward toggling between said image tiles.

8. A system for reviewing digitized images of pathology specimens according to claim 6, wherein said image processing system is further configured to associate a viewed status with each of said plurality of image tiles that is indicative of whether each of said plurality of image tiles has been displayed on said image display system during a user session.

9. A system for reviewing digitized images of pathology specimens according to claim 8, wherein said image processing system is further configured to display said viewed status as each of said plurality of image tiles is displayed on said image display system during said user session.

10. A system for reviewing digitized images of pathology specimens according to claim 8, wherein said image processing system is further configured to display a thumbnail image of said tissue-particle image on said image display system, said thumbnail image including a visual indicator of said viewed status of each of said plurality of image tiles of said tissue-particle images during said user session.

11. A system for reviewing digitized images of pathology specimens according to claim 6, wherein said image processing system is further configured to associate a viewed time with each of said plurality of image tiles and provide a visual indication of an amount of time each of said plurality of image tiles has been displayed on said image display system during a user session.

12. A non-transitory computer-readable medium comprising computer-executable code for a system for reviewing digitized images of pathology specimens, said computer-executable code comprising instructions that, when executed by a computer, causes said computer to:
   receive a whole-slide digital image of a pathology specimen,
   segment said whole-slide digital image into a tissue-particle image within said whole-slide digital image, represent said tissue-particle image as a plurality of image tiles such that each of said plurality of image tiles can be displayed sequentially on an image display system to permit a substantially complete, tile-by-tile review of said tissue-particle image in a predefined order;

wherein segmenting said whole-slide digital image segments said whole-slide digital image into a plurality of tissue-particle images, represent each of said plurality of tissue-particle images as respective pluralities of image tiles such that each respective plurality of image tiles can be displayed sequentially on said image display system to permit a substantially complete, tile-by-tile review of each of said plurality of tissue-particle images in respective predefined orders; and reorient each of said tissue-particle images, independently, prior to representing each of said tissue-particle images as said respective pluralities of image tiles.

13. The non-transitory computer-readable medium according to claim 12, wherein said plurality of image tiles are substantially equal in image size and are a minimum number of image tiles required to provide a complete, tile-by-tile review of said tissue-particle image.

14. The non-transitory computer-readable medium according to claim 12, wherein said computer-executable code further comprises instructions that, when executed by said computer, causes said computer to reorient said tissue-particle image prior to representing said tissue-particle image as said plurality of image tiles.

15. The non-transitory computer-readable medium according to claim 14, wherein said computer-executable code further comprises instructions that, when executed by said computer, causes said computer to determine a longitudinal dimension and a lateral dimension of said tissue-particle image such that said longitudinal dimension is an effective long axis of said tissue-particle image and said lateral dimension is an effective short axis of said tissue-particle image.

16. The non-transitory computer-readable medium according to claim 15, wherein said reorienting said tissue-particle image comprises aligning said longitudinal axis along a preferred viewing axis.

17. The non-transitory computer-readable medium according to claim 12, wherein said computer-executable code further comprises instructions that, when executed by said computer, causes said computer to receive signals from a user input device to permit a user to toggle between said image tiles.

18. The non-transitory computer-readable medium according to claim 17, wherein said toggling between image tiles comprises both forward and backward toggling between said image tiles.

19. The non-transitory computer-readable medium according to claim 17, wherein said computer-executable code further comprises instructions that, when executed by said computer, causes said computer to associate a viewed status with each of said plurality of image tiles that is indicative of whether each of said plurality of image tiles has been displayed on said image display system during a user session.

20. The non-transitory computer-readable medium according to claim 19, wherein said computer-executable code further comprises instructions that, when executed by said computer, causes said computer to provide said viewed status as each of said plurality of image tiles is displayed on said image display system during said user session.

21. The non-transitory computer-readable medium according to claim 19, wherein said computer-executable code further comprises instructions that, when executed by said computer, causes said computer to provide a thumbnail image of said tissue-particle image to be displayed on said image display system, said thumbnail image including a visual indicator of said viewed status of each of said plurality of image tiles of said tissue-particle images during said user session.

22. The non-transitory computer-readable medium according to claim 17, wherein said computer-executable code further comprises instructions that, when executed by said computer, causes said computer to associate a viewed time with each of said plurality of image tiles and provide a visual indication of an amount of time each of said plurality of image tiles has been displayed on said image display system during a user session.

23. A method for reviewing digitized images of pathology specimens, comprising:

receiving a whole-slide digital image of a pathology specimen;

segmenting said whole-slide digital image into a tissue-particle image within said whole-slide digital image;

representing said tissue-particle image as a plurality of image tiles such that each of said plurality of image tiles can be displayed sequentially on an image display system to permit a substantially complete, tile-by-tile review of said tissue-particle image in a predefined order;

wherein said segmenting said whole-slide digital image segments said whole-slide digital image into a plurality of tissue-particle images, and representing each of said plurality of tissue-particle images as respective pluralities of image tiles such that each respective plurality of image tiles can be displayed sequentially on said image display system to permit a substantially complete, tile-by-tile review of each of said plurality of tissue-particle images in respective predefined orders; and reorienting each of said tissue-particle images, independently, prior to said representing each of said tissue-particle images as said respective pluralities of image tiles.

24. The method according to claim 23, wherein said plurality of image tiles are substantially equal in image size and are a minimum number of image tiles required to provide a complete, tile-by-tile review of said tissue-particle image.

25. The method according to claim 23, further comprising reorienting said tissue-particle image prior to said representing said tissue-particle image as said plurality of image tiles.

26. The method according to claim 25, further comprising determining a longitudinal dimension and a lateral dimension of said tissue-particle image such that said longitudinal dimension is an effective long axis of said tissue-particle image and said lateral dimension is an effective short axis of said tissue-particle image.

27. The method according to claim 26, wherein said reorienting said tissue-particle image comprises aligning said longitudinal axis along a preferred viewing axis.

28. The method according to claim 23, further comprising toggling between image tiles using a user input device.

29. The method according to claim 28, wherein said toggling between image tiles comprises both forward and backward toggling.

30. The method according to claim 29, further comprising associating a viewed status with each of said plurality of image tiles that is indicative of whether each of said plurality of image tiles has been displayed on said image display system during a user session.

31. The method according to claim 30, further comprising displaying said viewed status as each of said plurality of image tiles is displayed on said image display system during said user session.

32. The method according to claim 30, further comprising displaying a thumbnail image of said tissue-particle image on said image display system, said thumbnail image including a visual indicator of said viewed status of each of said plurality of image tiles of said tissue-particle images during said user session.

33. The method according to claim 29, further comprising associating a viewed time with each of said plurality of image tiles and provide a visual indication of an amount of time each of said plurality of image tiles has been displayed on said image display system during a user session.

\* \* \* \* \*